US012810843B2

(12) United States Patent
Rosenberg et al.

(10) Patent No.: US 12,810,843 B2
(45) **Date of Patent: *Nov. 24, 2026**

(54) SUPERVISED AND UNSUPERVISED TRAINING WITH CONTRASTIVE LOSS OVER SEQUENCES

(71) Applicant: Google LLC, Mountain View, CA (US)

(72) Inventors: Andrew Rosenberg, Brooklyn, NY (US); Bhuvana Ramabhadran, Mt. Kisco, NY (US); Zhehuai Chen, Edgewater, NJ (US); Yuan Wang, Brooklyn, NY (US); Yu Zhang, Mountain View, CA (US); Jesse Emond, Mountain View, CA (US)

(73) Assignee: Google LLC, Mountain View, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 19/034,304

(22) Filed: Jan. 22, 2025

(65) Prior Publication Data

US 2025/0166614 A1 May 22, 2025

Related U.S. Application Data

(63) Continuation-in-part of application No. 17/655,903, filed on Mar. 22, 2022, now Pat. No. 12,230,249.

(Continued)

(51) Int. Cl.

| | |
|---|---|
| ***G10L 15/06*** | (2013.01) |
| ***G06N 3/0464*** | (2023.01) |
| ***G06N 3/09*** | (2023.01) |

(52) U.S. Cl.

CPC .......... *G10L 15/063* (2013.01); *G06N 3/0464* (2023.01); *G06N 3/09* (2023.01)

(58) Field of Classification Search

None

See application file for complete search history.

(56) References Cited

U.S. PATENT DOCUMENTS

| | | | |
|---|---|---|---|
| 2018/0174576 | A1 | 6/2018 | Soltau et al. |
| 2019/0005947 | A1 | 1/2019 | Kim et al. |

(Continued)

FOREIGN PATENT DOCUMENTS

| | | | |
|---|---|---|---|
| CN | 111899758 | A | 11/2020 |
| CN | 111916067 | A | 11/2020 |

OTHER PUBLICATIONS

Ko et al. "Audio Augmentation for Speech Recognition", Interspeech 2015 (Year: 2015).*

(Continued)

*Primary Examiner* — Nicole A K Schmieder

(74) *Attorney, Agent, or Firm* — Honigman LLP; Brett A. Krueger

(57) ABSTRACT

A method includes receiving audio data corresponding to an utterance and generating a pair of positive audio data examples. Here, each positive audio data example includes a respective augmented copy of the received audio data. For each respective positive audio data example, the method includes generating a respective sequence of encoder outputs and projecting the respective sequence of encoder outputs for the positive data example into a contrastive loss space. The method also includes determining a L2 distance between each corresponding encoder output in the projected sequences of encoder outputs for the positive audio data examples and determining a per-utterance consistency loss by averaging the L2 distances. The method also includes generating corresponding speech recognition results for each respective positive audio data example. The method also includes updating parameters of the speech recognition (Continued)

model based on a respective supervised loss term and the per-utterance consistency loss.

20 Claims, 6 Drawing Sheets

Related U.S. Application Data

(60) Provisional application No. 63/166,908, filed on Mar. 26, 2021.

(56) References Cited

U.S. PATENT DOCUMENTS

| | | | |
|---|---|---|---|
| 2019/0236451 | A1 | 8/2019 | Jaitly et al. |
| 2019/0287515 | A1 | 9/2019 | Li et al. |
| 2019/0341025 | A1 | 11/2019 | Omote et al. |
| 2022/0230651 | A1 | 7/2022 | Zhu et al. |

OTHER PUBLICATIONS

Chen Junda et al: "Research and Application of Deep Learning Methods to Selected Problems in Radar Signal Recognition", Database of Full-Text Outstanding Master's Theses from China (Information Technology Series), Dec. 16, 2019 (Dec. 16, 2019), pp. 1-20.
Dongwei Jiang et al: "Speech SIMCLR: Combining Contrastive and Reconstruction Objective for Self-supervised Speech Representation Learning", https://arxiv.org/abs/2010.13991, Oct. 27, 2020 (Oct. 27, 2020).
Chinese Office Action for the related Application No. 202280037348.0 dated Mar. 24, 2026.
Wei Xia et al: "Self-Supervised Text-Independent Speaker Verification Using Prototypical Momentum Contrastive Learning" <https://arvix.org/pdf/2012.07178,> retrieved from the internet on Mar. 12, 2024.
Indian Office Action for the related Application No. 202347069974 dated Apr. 4, 2025.
Jun. 13, 2022 Written Opinion (WO) of the International Searching Authority (ISA) and International Search Report (ISR) issued in International Application No. PCT/US2022/021368.
Yu Zhang et al: "Pushing the Limits of Semi-Supervised Learning for Automatic Speech Recognition", arxiv.org, Cornell University Library, 201 Olin Library Cornell University Ithaca, NY 14853, Oct. 20, 2020 (Oct. 20, 2020).
Wang Gary et al: "Improving Speech Recognition Using Consistent Predictions on Synthesized Speech", ICASSP 2020—2020 IEEE International Conference on Acoustics, Speech and Signal Processing (ICASSP), IEEE, May 4, 2020 (May 4, 2020), pp. 7029-7033.
Jiang et al. "Speech SIMCLR: Combining Contrastive and Reconstruction Objective for Self-Supervised Speech Representation Learning", arXiv:2010.13991v1, Oct. 27, 2020. (Year: 2020).
Masumura et al. "Sequence-Level Consistency Training for Semi-Supervised End-To-End Automatic Speech Recognition", IEEE, 2020. (Year: 2020).

* cited by examiner

SUPERVISED AND UNSUPERVISED TRAINING WITH CONTRASTIVE LOSS OVER SEQUENCES

CROSS REFERENCE TO RELATED APPLICATIONS

This U.S. patent application is a continuation of, and claims priority under 35 U.S.C. § 120 from, U.S. patent application Ser. No. 17/655,903, filed on Mar. 22, 2022, which claims priority under 35 U.S.C. § 119(e) to U.S. Provisional Application 63/166,908, filed on Mar. 26, 2021. The disclosures of these prior applications are considered part of the disclosure of this application and are hereby incorporated by reference in their entireties.

TECHNICAL FIELD

This disclosure relates to supervised and unsupervised training with contrastive loss over sequences.

BACKGROUND

Automatic speech recognition (ASR), the process of taking an audio input and transcribing it into text, has been an important technology that is used in mobile device and other devices. In general, automatic speech recognition attempts to provide accurate transcriptions of what a person has said by taking an audio input (e.g., speech utterance) and transcribing the audio input into text. Modern ASR models continue to improve in both accuracy (e.g., a low word error rate (WER)) and latency (e.g., delay between the user speaking and the transcription) based on the ongoing development of deep neural networks. However, one challenge in developing deep learning-based ASR models is that parameters of the ASR models tend to over fit the training data, thereby resulting in the ASR models having difficulties generalizing unseen data when the training data is not extensive enough. As a result, training ASR models on larger training datasets improves the accuracy of the ASR model. Applying data augmentation on training datasets can increase the acoustic diversity of the training dataset used to train the ASR models.

SUMMARY

One aspect of the disclosure provides a computer-implemented method that when executed on data processing hardware causes the data processing hardware to perform operations for supervised and unsupervised training with contrastive loss over sequences. The operations include receiving audio data corresponding to an utterance. The operations also include generating, using a data augmentation module, a pair of positive audio data examples. Here, each positive audio data example in the pair of positive audio data examples includes a respective augmented copy of the received audio data that corresponds to the utterance. For each respective positive audio data example in the pair of positive audio data examples, the operations include generating a respective sequence of encoder outputs using a neural network encoder and projecting, using a convolutional neural network (CNN), the respective sequence of encoder outputs for the respective positive audio data example into a contrastive loss space. The operations also include determining a L2 distance between each corresponding encoder output in the projected sequences of encoder outputs for the positive audio data examples. The operations also include determining a per-utterance consistency loss by averaging the L2 distances determined for the encoder outputs in the projected sequences of encoder outputs. The operations also include generating corresponding speech recognition results for each respective positive audio data example in the pair of positive audio data examples using a speech recognition model. The operations also include updating parameters of the speech recognition model based on a respective supervised loss term associated with each corresponding speech recognition result and the per-utterance consistency loss.

Implementations of the disclosure may include one or more of the following optional features. In some implementations, the CNN includes a first CNN layer followed by a rectified linear activation function (ReLU) activation and LayerNorm layer, and a second CNN layer with linear activation. The data augmentation module may add at least one of noise, reverberation, or manipulates timing of the received audio data. In some examples, the speech recognition model includes a sequence transducer model having a Conformer-based encoder and a long short-term (LSTM) decoder. In these examples, the Conformer-based encoder includes a stack of conformer layers each including a series of multi-headed self-attention, depth-wise convolution, and feedforward layers.

In some implementations, the operations further include receiving a set of training utterances each including a non-synthetic speech representation of a corresponding utterance and, for each training utterance in the set of training utterances, converting a ground truth transcription of the corresponding to generate one or more synthetic speech representations of the same corresponding utterance using a text-to-speech (TTS) model. Here, receiving the audio data corresponding to the utterance includes receiving one of the non-synthetic speech representations of the corresponding utterance or one of the one or more synthetic speech representations of the corresponding utterance. In some examples, generating corresponding speech recognition results for each respective positive audio data example in the pair of positive audio data examples includes determining, using a decoder, a probability distribution over possible speech recognition hypotheses for the respective sequence of encoder outputs.

The operations may further include determining the respective supervised loss term by comparing the corresponding speech recognition result for the respective positive audio data example and a corresponding ground-truth transcription of the respective positive audio data example. In some implementations, each positive audio data example in the pair of positive audio data examples includes a different respective augmented copy of the received audio data that corresponds to the utterance than each other positive audio data example in the pair of positive audio data examples. In some examples, the generating the pair of positive audio data examples includes generating each positive audio data example in the pair of positive audio data examples based on a single observation of the utterance.

Another aspect of the disclosure provides a system that includes data processing hardware and memory hardware storing instructions that when executed on the data processing hardware causes the data processing hardware to perform operations. The operations include receiving audio data corresponding to an utterance. The operations also include generating, using a data augmentation module, a pair of positive audio data examples. Here, each positive audio data example in the pair of positive audio data examples includes a respective augmented copy of the received audio data that corresponds to the utterance. For each respective positive audio data example in the pair of positive audio data examples, the operations include generating a respective sequence of encoder outputs using a neural network encoder and projecting, using a convolutional neural network (CNN), the respective sequence of encoder outputs for the respective positive audio data example into a contrastive loss space. The operations also include determining a L2 distance between each corresponding encoder output in the projected sequences of encoder outputs for the positive audio data examples. The operations also include determining a per-utterance consistency loss by averaging the L2 distances determined for the encoder outputs in the projected sequences of encoder outputs. The operations also include generating corresponding speech recognition results for each respective positive audio data example in the pair of positive audio data examples using a speech recognition model. The operations also include updating parameters of the speech recognition model based on a respective supervised loss term associated with each corresponding speech recognition result and the per-utterance consistency loss.

Implementations of the disclosure may include one or more of the following optional features. In some implementations, the CNN includes a first CNN layer followed by a rectified linear activation function (ReLU) activation and LayerNorm layer, and a second CNN layer with linear activation. The data augmentation module may add at least one of noise, reverberation, or manipulates timing of the received audio data. In some examples, the speech recognition model includes a sequence transducer model having a Conformer-based encoder and a long short-term (LSTM) decoder. In these examples, the Conformer-based encoder includes a stack of conformer layers each including a series of multi-headed self-attention, depth-wise convolution, and feedforward layers.

In some implementations, the operations further include receiving a set of training utterances each including a non-synthetic speech representation of a corresponding utterance and, for each training utterance in the set of training utterances, converting a ground truth transcription of the corresponding to generate one or more synthetic speech representations of the same corresponding utterance using a text-to-speech (TTS) model. Here, receiving the audio data corresponding to the utterance includes receiving one of the non-synthetic speech representations of the corresponding utterance or one of the one or more synthetic speech representations of the corresponding utterance. In some examples, generating corresponding speech recognition results for each respective positive audio data example in the pair of positive audio data examples includes determining, using a decoder, a probability distribution over possible speech recognition hypotheses for the respective sequence of encoder outputs.

The operations may further include determining the respective supervised loss term by comparing the corresponding speech recognition result for the respective positive audio data example and a corresponding ground-truth transcription of the respective positive audio data example. In some implementations, each positive audio data example in the pair of positive audio data examples includes a different respective augmented copy of the received audio data that corresponds to the utterance than each other positive audio data example in the pair of positive audio data examples. In some examples, the generating the pair of positive audio data examples includes generating each positive audio data example in the pair of positive audio data examples based on a single observation of the utterance.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
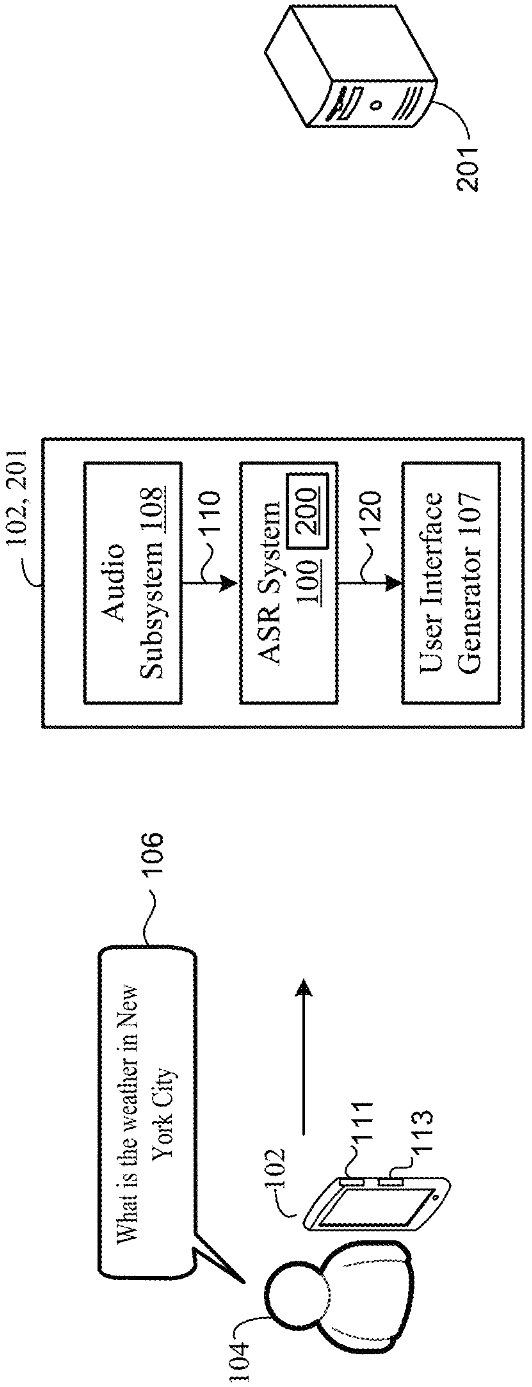
FIG. 1 is a schematic view of an example speech recognition system.

Automated speech recognition (ASR) has made tremendous strides with the introduction of sequence to sequence (Seq2Seq) models that map from audio to character sequences. At the same time, text-to-speech (TTS) or speech synthesis systems have successfully applied Seq2Seq models to obtain state of the art natural, realistic sounding synthesized speech that can be indistinguishable to the human ear from human speech.

One challenge in developing deep learning-based ASR models is that parameters of the ASR models tend to over fit the training data, thereby resulting in the ASR models having difficulties generalizing unseen data when the training data is not extensive enough. Thus, training ASR models on larger training datasets improves the accuracy of the ASR model. For instance, the use of machine learning or other statistical methods can train ASR models on training data sets that include upwards of 10,000 hours of transcribed speech. Yet, performance of ASR models suffers when a domain associated with the training data is distinct from a domain at which the ASR model will be deployed during inference. For example, training an ASR model on transcribed speech in a domain associated with video meetings would be less effective in recognizing speech related to voice search queries, and vice versa.

Synthesized speech has the potential to drastically limit the amount of labeled human speech required to train ASR models, while also providing flexibility in moving the ASR model across different domains. Generally, the use of synthesized speech has been shown to impact ASR training differently than human speech, despite instances of state of the art synthesized speech being indistinguishable from human speech. This gap between synthesized speech and human speech is attributed to mismatches in the synthesized speech data from the human speech data that arise from the difficult one-to-many mapping problem that text-to-speech (TTS) systems are trying to solve. Namely, while the aggregate quality of available synthesized speech is very high, the synthesized speech exhibits much less variation than human speech, as well as minimal speech disfluencies. As a result, training ASR models exclusively on synthesized speech data presents a difficulty generalizing real speech utterances during inference.

Augmenting synthetic and non-synthetic speech of training data sets can increase the acoustic diversity of the training data sets. Notably, augmenting a training speech utterance may generate multiple training speech utterances from the single training speech utterance. Here, a different augmentation technique may be applied to each of the multiple augmented training speech utterances. Thus, applying data augmentation to synthetic and non-synthetic speech of training data sets may also drastically limit the amount of labeled human speech required in order to train ASR models.

Implementations herein are directed towards methods and systems of augmenting training utterances for training ASR models when large amounts of labeled training data is not available or less prevalent. More specifically, implementations herein are directed towards a supervised training process of an ASR model that includes consistency under regularization. The training process includes generating a pair of positive audio data examples using a data augmentation module for a received training utterance. Each audio data example includes a different augmented copy of the received training utterance. For each positive data example, an encoder generates a respective sequence of encoder outputs and projects the respective sequence of encoder outputs into a contrastive loss space. A consistency loss module determines a L2 distance between each corresponding encoder output of projected sequences of encoder outputs and determines a per-utterance consistency loss (i.e., contrastive loss) by averaging the L2 distances. As will become apparent, training the ASR model includes updating parameters of the ASR model based on a combination of supervised losses and the per-utterance consistency losses.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware 111 and memory hardware 113.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with input acoustic frames 110 capable of being processed by the ASR system 100. In the example shown, the user speaks a respective utterance 106 in a natural language of English for the phrase "What is the weather in New York City?" and the audio subsystem 108 converts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription 120 into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

Figure 2:
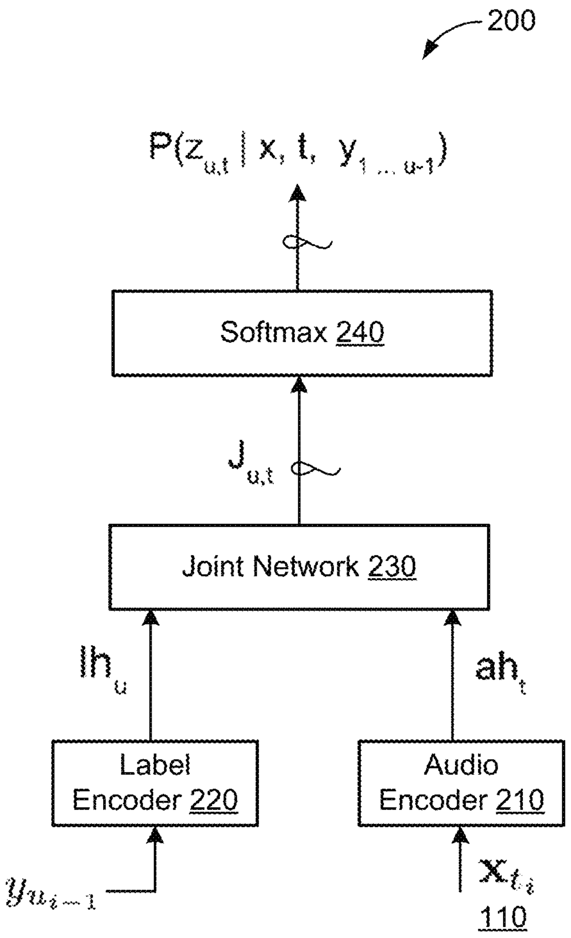
FIG. 2 is a schematic view of a Recurrent Neural Network-Transducer (RNN-T) model architecture.

Referring to FIG. 2, an example frame alignment-based transducer model 200*a* includes a Recurrent Neural Network-Transducer (RNN-T) model architecture which adheres to latency constrains associated with interactive applications. The use of the RNN-T model architecture is exemplary, and the frame alignment-based transducer model 200 may include other architectures such as transformer-transducer and conformer-transducer model architectures among others. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network encoder 210 (also referred to as simply "encoder 210"), which is roughly analogous to an acoustic model (AM) in a traditional ASR system, includes a recurrent network of stacked Long Short-Term Memory (LSTM) layers. For instance, the encoder reads a sequence of d-dimensional feature vectors (e.g., acoustic frames 110 (FIG. 1)) $x=(x_1, x_2, \ldots, x_T)$, where $$X_t \in \mathbb{R}_d,$$

and produces at each output step a higher-order feature representation. This higher-order feature representation is denoted as $$h_1^{enc}, \ldots, h_T^{enc}.$$

Similarly, the prediction network 220 is also an LSTM network (i.e., LSTM decoder), which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network then predicts $$P(y_i | x_{t_i}, y_0, \ldots, y_{u_{i-1}}),$$

which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in a streaming fashion.

In some examples, the encoder network (i.e., audio encoder) 210 of the RNN-T model 200 includes is a Conformer-based encoder that includes a stack of conformer layers. Here, each conformer layer includes a series of multi-headed self-attention, depth wise convolution, and feed-forward layers. The encoder network 210 may include other types of encoders having multi-headed self-attention mechanisms. For instance, the encoder network 210 may be a Transformer-based encoder or a lightweight convolutional (LConv) based encoder. The encoder network 210 may also be RNN-based including a series of LSTM layers. The prediction network 220 may have two 2,048-dimensional LSTM layers, each of which is also followed by 640-dimensional projection layer. Alternatively, the prediction network 220 may include a stack of transformer or conformer blocks, or a embedding look-up table in lieu of LSTM layers. Finally, the joint network 230 may also have 640 hidden units. The Softmax layer 240 may be composed of a unified word piece or grapheme set that is generated using all unique word pieces or graphemes in a plurality of training data sets.

Figure 3:
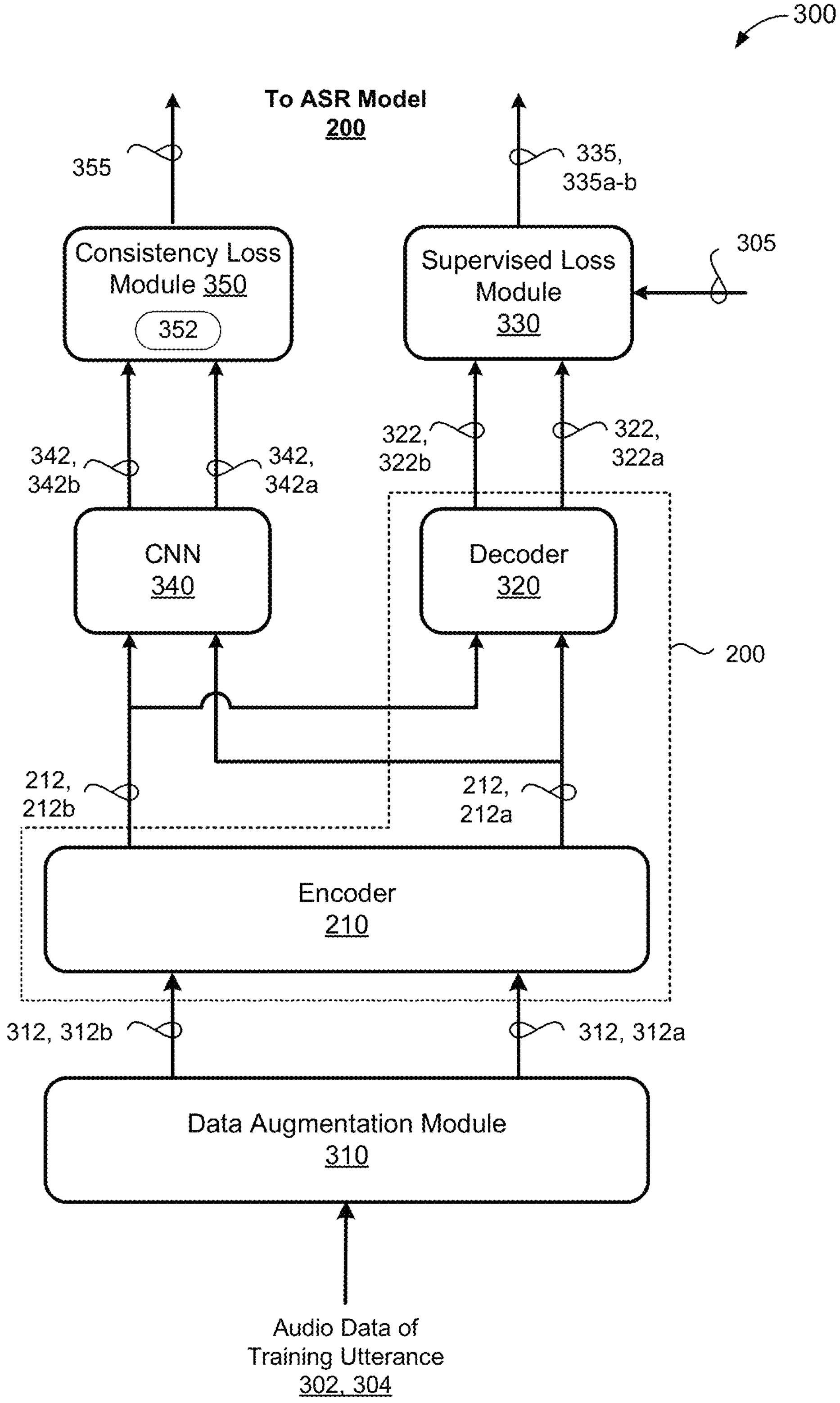
FIG. 3 is a schematic view of an example training process of a speech recognition model.
Figure 4:
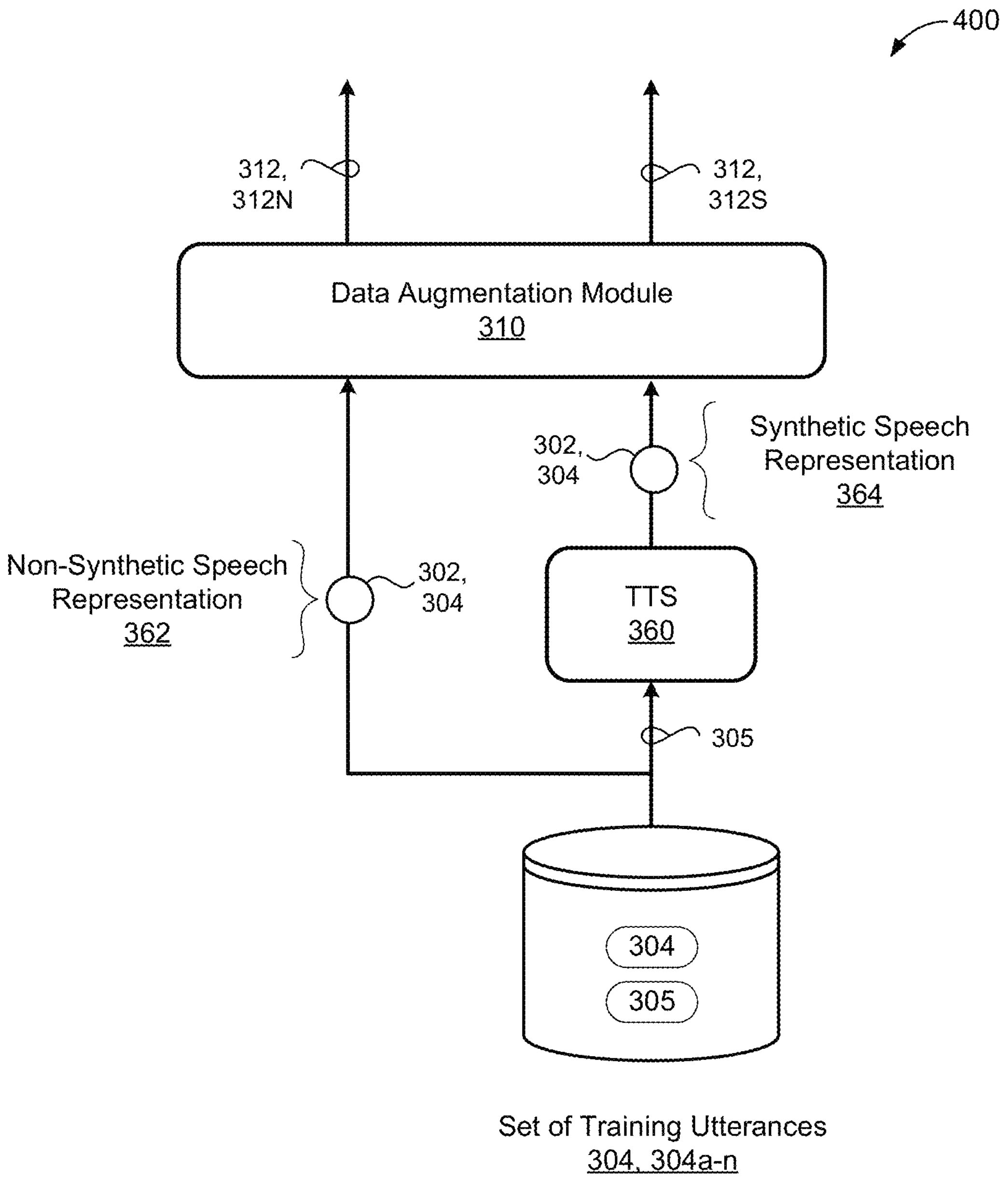
FIG. 4 is a schematic view of generating positive audio data examples using non-synthetic speech representations and synthetic speech representations.

FIG. 3 illustrates an example training process 300 for training the ASR model 200. Here, the example training process 300 includes a supervised training component and an unsupervised training component. The example training process 300 (also referred to as simply "training process 300") includes a data augmentation module 310 that receives audio data 302 corresponding to a training utterance 304 from a set of training utterances 304, 304*a-n* (FIG. 4). The audio data 302 may represent a non-synthetic speech representation or a synthetic speech representation of the training utterance 304, as described in more detail with reference to FIG. 4.

The data augmentation module 310 is configured to further the acoustic diversity of the training utterances 304 used to train the ASR model 200. In some examples, the data augmentation module 310 applies data augmentation techniques that include at least one of adding/injecting noise, adding reverberation, and/or manipulating timing (e.g., stretching) of the audio data 302. Optionally, the data augmentation techniques may include time warping. Another data augmentation technique includes using multi-style training (MTR) to inject a variety of environmental noises to the audio data 302.

The data augmentation module 310 applies any combination of the data augmentation techniques on the received audio data 302 to generate a pair of positive audio data examples 312. In the example shown, the pair of positive audio data examples 312 includes two positive data examples (i.e., a first positive audio data example 312, 312*a* and a second positive audio data example 312, 312*b*) for the sake of clarity only, however, it is understood that the pair of positive audio data examples 312 can include any number of positive audio data examples 312. For example, the pair of positive audio data examples 312 may include five positive audio data examples 312 (e.g., in this example the pair of positive audio data examples 312 may also be referred to as a group of positive audio data examples 312).

The data augmentation module 310 generates each positive audio data example 312 in the pair of positive audio data examples 312 based on a single observation of the audio data 302 that corresponds to the training utterance 304. Put another way, each positive audio data example 312 in the pair of positive audio data examples 312 represents the same audio data 302 and the same training utterance 304 (i.e., the audio data examples 312 in each pair are lexically the same). The data augmentation module 310 may apply a different data augmentation technique (e.g., noise, reverberation, and/or timing manipulation) to each positive audio data example 312 in the pair of positive audio data examples 312 to provide acoustic diversity between the positive audio data examples 312. In some instances, the data augmentation module 310 applies the same data augmentation technique to each positive audio data example 312, but applies different amounts of data augmentation technique to each positive audio data example 312. For example, the data augmentation module 310 may apply a first amount of noise to the first positive audio data example 312*a* and a second amount of noise to the second positive audio data example 312*b*.

As such, each positive audio data example 312 in the pair of positive audio data examples 312 includes a respective augmented copy of the received audio data 302 that corresponds to the training utterance 304. Notably, each positive audio data example 312 includes a different respective augmented copy of the received audio data 302 than the other positive audio data examples 312. Accordingly, the collection of different augmented copies of the same received audio data 302 increases the acoustic diversity of the audio data 302 used in training the ASR model 200. In the example shown, the data augmentation module 310 generates the first positive audio data example 312*a* and the second positive audio data example 312*b* using the audio data 302 that corresponds to the same utterance. Here, the first positive audio data example 312*a* includes a first augmented copy of the audio data 302 and the second positive audio data example 312*b* includes a second augmented copy of the audio data 302 that is different than the first augmented copy.

The training process 300 also includes the encoder 210 of the ASR model 200. The encoder 210 receives, as input, each positive audio data example 312 in the pair of positive audio data examples 312 and generates, as output, a respective sequence of encoder outputs 212 that corresponds to the respective positive audio data example 312. In the example shown, the encoder 210 receives the first positive audio data example 312 and generates a first sequence of encoder outputs 212, 212*a* corresponding to the first positive audio data example 312*a*. Continuing with the example shown, the encoder 210 also receives the second positive audio data example 312*b* and generates a second sequence of encoder outputs 212, 212*b* corresponding to the second positive audio data example 312*b*.

In some implementations, the training process 300 determines a supervised loss term 335 (e.g., supervised training component) associated with speech recognition results 322 for each positive audio data example 312. In these implementations, the training process 300 includes a decoder 320 and a supervised loss term module 330. The decoder 320 is configured to decode the sequence of encoder outputs 212 output by the encoder 210 and determine a probability distribution 322 over possible speech recognition hypotheses. That is, the probability distribution 322 over possible speech recognition hypotheses indicates a probability of different speech recognition results. As such, speech recognition results 322 and the probability distribution 322 over possible speech recognition hypotheses may be used interchangeably.

In some examples, the decoder 320 includes the joint network 230 (i.e., decoder) (FIG. 2) of the ASR model 200. In other examples, the decoder 320 is an auxiliary decoder, independent of the ASR model 200, which includes Connectionist Temporal Classification (CTC) decoders, Lister Attend Spell (LAS) decoders, or RNN-T decoders. Accordingly, the dotted line surrounding the encoder 210 and the decoder 320 shown in FIG. 3 denotes that, in some instances, the encoder 210 and the decoder 320 are both part of the ASR model 200 and, in other instances, the decoder 320 is an auxiliary decoder separate from the ASR model 200. In some implementations, the decoder 320 includes at least one of a phoneme decoder configured to decode a sequence of phonemes, a wordpiece decoder configured to decode a sequence of word pieces, or a grapheme decoder configured to decode a sequence of graphemes.

Accordingly, the decoder 320 receives, as input, each respective sequence of encoder outputs 212 and generates, as output, the probability distribution 322 over possible speech recognition hypotheses (i.e., speech recognition result) for the corresponding positive audio data example 312. In some examples, the probability distribution 322 over possible speech recognition hypotheses includes one of possible phoneme labels or possible word piece labels. In the example shown, the decoder 320 generates a first probability distribution 322, 322*a* over possible speech recognition hypotheses using the first sequence of encoder outputs 212*a* and generates a second probability distribution 322, 322*b* over possible speech recognition hypotheses using the second sequence of encoder outputs 212*b*.

Thereafter, the supervised loss term module 330 may determine a supervised loss term 335 based on the probability distribution 322 over possible speech recognition hypotheses and a ground-truth transcription 305 corresponding to the training utterance 304. That is, in some instances, each training utterance 304 is paired with a corresponding ground-truth transcription 305 (i.e., paired training data). Thus, the supervised loss term module 330 may compare the speech recognition results 322 and the corresponding ground-truth transcription 305 to determine an accuracy of the ASR model 200 prediction. In the example shown, the supervised loss term module 330 compares the first probability distribution 322*a* and a ground-truth transcription 305 to determine a first supervised loss term 335, 335*a*, and compares the second probability distribution 322*b* and the ground-truth transcription 305 to determine a second supervised loss term 335, 335*b*. The training process 300 updates parameters of the ASR model 200 based on the supervised loss terms 335. For example, the training process 300 may update parameters of the encoder of the ASR model 200.

In some implementations, the training process 300 determines a per-utterance consistency loss 355 (e.g., unsupervised training component) for the ASR model 200. Here, ground-truth transcriptions 305 may not be available for the training utterances and/or the training process 300 may aim to promote consistency across positive audio data examples 312 with different augmented copies of the audio data 302. In these implementations, the training process 300 includes a convolutional neural network (CNN) 340 and a consistency loss term module 350. The CNN 340 projects the respective sequence of encoder outputs 212 for the respective positive audio data example 312 received from the encoder 210 into a contrastive loss space. That is, the CNN 340 generates the projected sequence of encoder outputs 342.

In some examples, the CNN 340 includes a first CNN layer with 356 (4×1) filters, that is followed by a rectified linear activation function (ReLU) activation and a LayerNorm layer, and a second CNN layer 16 (1×1) filters with linear activation. That is, the CNN 340 maps the sequence of encoder outputs 212 into the contrastive loss space to determine the per-utterance consistency loss 355. In the examples shown, the CNN 340 projects the first sequence of encoder outputs 212*a* into the contrastive loss space (e.g., a first projected sequence of encoder outputs 342, 342*a*) and projects the second sequence of encoder outputs 212*b* into the contrastive loss space (e.g., a second projected sequence of encoder outputs 342, 342*b*).

Thereafter, the consistency loss term module 350 receives the projected sequences of encoder outputs 342 and determines a L2 distance 352 between each corresponding encoder output in the projected sequences of encoder outputs 342 for the positive audio data examples 312. That is, a positive pair of audio data examples 312 (i.e., $x_i$ and $x_j$) may have a contrastive loss or L2 distance 352 represented as follows:

$$l_{i,j} = -\log\frac{\exp(sim(z_i, z_j)/\tau)}{\sum_{k=1}^{2N} II_{[k\neq i]}\exp(sim(z_i, z_k)/\tau)} \tag{1}$$

In Equation 1, $$sim(u, v) = u^T v/\|u\|\|v\|$$

is a cosine similarity function and $\tau$ represents a temperature parameter.

A max mean discrepancy (MMD) is a non-parametric distance measurement between sequence of encoder outputs $z_i:=\{x_1, \ldots, x_n\}\sim P$ and $z_j:=\{x_1, \ldots, x_n\}\sim Q$. In particular, MMD measures a kernel mean between two distributions in Reproducing Kernel Hilbert Space. The MMD loss between the sequence of encoder outputs may be represented as follows:

$$\overline{MM}D(P, Q) = \frac{1}{n^2}\sum_{i=1}^{n}\sum_{j=1}^{n} k(x_i, x_j) + \frac{1}{m^2}\sum_{i=1}^{m}\sum_{j=1}^{m} k(y_i, y_j) - \frac{2}{nm}\sum_{i=1}^{n}\sum_{j=1}^{m} k(x_i, y_j) \quad (2)$$

Here, k(x,y) is the Gaussian kernel represented as follows:

$$k(x, y) = \exp(-\gamma\|x - y\|) \quad (3)$$

Here, consistency regularization may include computing the L2 distances 352 between outputs of the encoder 210 between different positive a data examples 312. The consistency loss term module 350 determines a per-utterance consistency loss 355 by averaging the L2 distances 352 determined for the encoder outputs of the projected sequences of encoder outputs 342. The per-utterance consistency loss 355 may be represented as follows:

$$l_{i,j} = \frac{1}{N}\sum_{k=1}^{N}|z_i - z_j|^2 \quad (4)$$

In the example shown, the consistency loss term module 350 determines a L2 distance 352 between each corresponding encoder output in the first projected sequence of encoder outputs 342*a* and in the second projected sequence of encoder outputs 342*b* and determines the per-utterance consistency loss 355 by averaging the L2 distances 352 determined for each corresponding encoder output. Thus, the per-utterance consistency loss 355 provides the unsupervised training component by encouraging the encoder 210 to behave consistently regardless of the data augmentation applied to the positive training example 312.

The training process 300 updates parameters of the ASR model 200 based on the per-utterance consistency loss 355. For example, the training process 300 may update parameters of the encoder 210 of the ASR model 200. In some examples, the training process 300 updates parameters of the ASR model 200 using both the per-utterance consistency loss 355 and the supervised loss term 335 in parallel. Here, the ASR loss function including the per-utterance consistency loss 355 and the supervised loss term 335 may be represented as follows:

$$L(\theta, X) = L_{rnnt}(\theta, X) + \lambda L_{cons}(\theta, \theta_{cons}, X) \quad (5)$$

In Equation 5, $L_{rnnt}$ is the RNN-T loss, $L_{cons}$ is the consistency term, $\theta_{cons}$ is an optional parameter for the consistency function, and $\lambda$ is a regularizing coefficient. In some examples $\lambda=1$.

Referring now to a schematic view of FIG. 4, in some implementations, the data augmentation module 310 receives audio data 302 representing non-synthetic speech representations 362 and synthetic speech representations 364 for the same training utterance 304. Here, a set of training utterances 304, 304*a-n* includes a non-synthetic speech representation 362 for each training utterance 304 in the set of training utterances. The training utterances 304 may include utterances 106 spoken by the user 104 (FIG. 1). Moreover, each training utterance 304 may be paired with a corresponding ground-truth transcription 305. A text-to-speech (TTS) system 360 is configured to receive the ground-truth transcription 305 and generate audio data 302 corresponding to the synthetic speech representation 364 of the respective training utterance 304. In some implementations, the TTS system 360 generates multiple different synthetic speech representations 364 for a single training utterance 304 such that the different synthetic speech representations 364 are acoustically diverse from one another but lexically the same. In some examples, the TTS system 360 receives unspoken training text utterances that includes text-only data (i.e., unpaired data), such that each unspoken text utterance is not paired with any synthetic or non-synthetic speech representation.

Accordingly, the data augmentation module 310 receives the audio data 302 of the non-synthetic representation 362 of the training utterance 304 and/or receives the audio data 302 of the synthetic speech representation 364 of the same training utterance 304. Thus, the data augmentation module 310 generates a pair of non-synthetic positive audio data examples 312, 312N using the non-synthetic representation 362 and generates a pair of synthetic positive audio data examples 312, 312S using the synthetic speech representation 364. Notably, both the pair of non-synthetic positive audio data examples 312N and the synthetic positive audio data examples 312S correspond to the same training utterance 304, thereby greatly increasing the amount of training data that the training process 300 (FIG. 3) may use to train the ASR model 200. That is, audio data 302 that includes non-synthetic speech representations 362, synthetic speech representations 364, or some combination thereof may be used by the training process 300 (FIG. 3). As previously mentioned, the "pair" of non-synthetic positive audio data examples 312N generated by the data augmentation module 310 is not limited to two examples, but may include any number of positive audio data examples generated for the same non-synthetic speech representation 362. Similarly, the "pair" of synthetic positive audio data examples 312S generated by the data augmentation module 310 may include any number of positive audio data examples generated for the same synthetic speech representation 364.

Figure 5:
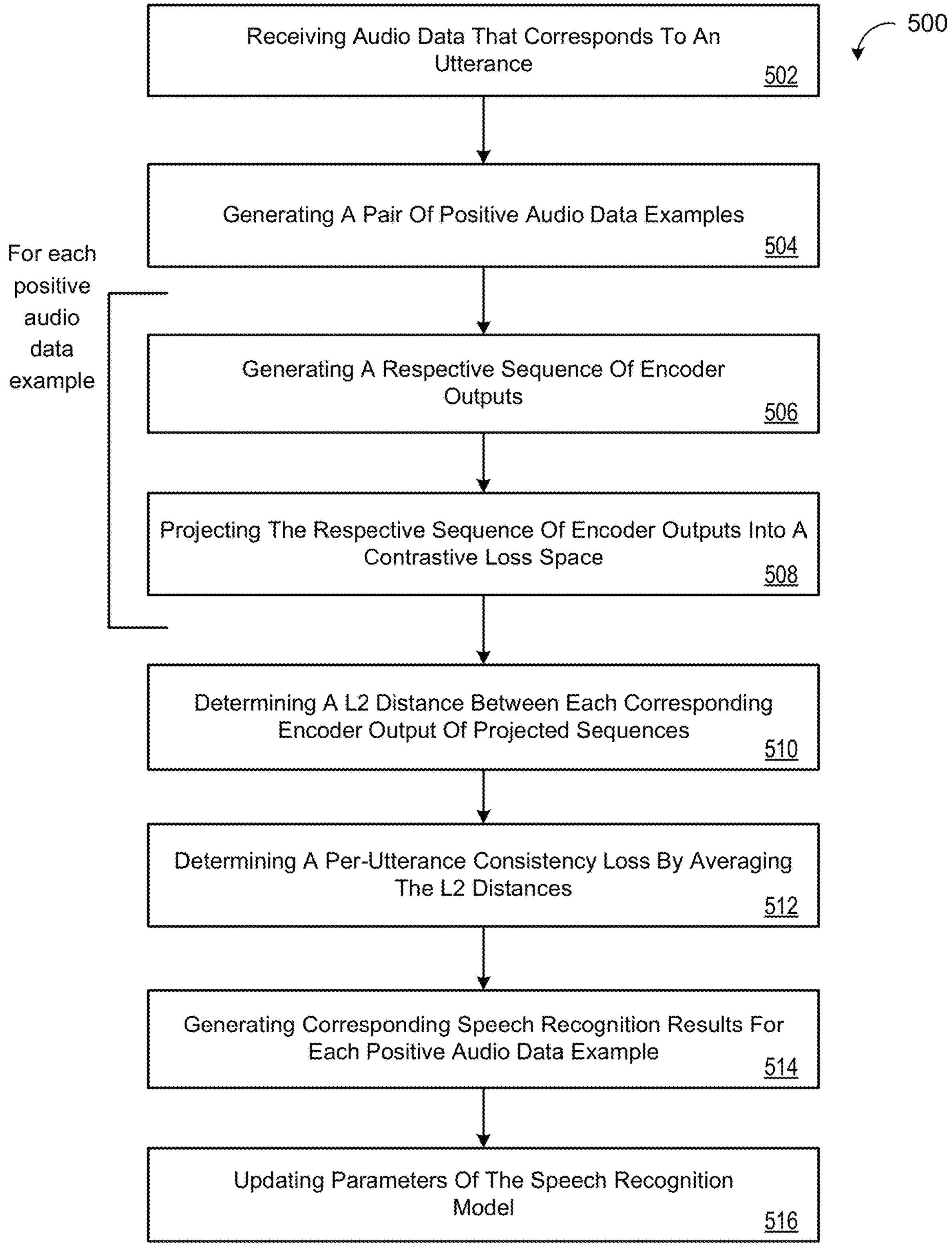
FIG. 5 is a flowchart of an example arrangement of operations for a method of supervised and unsupervised training with contrastive loss over sequences.

FIG. 5 is a flowchart of exemplary arrangement of operations for a computer-implemented method 500 for supervised and unsupervised training with contrastive loss over sequences. At operation 502, the method 500 includes receiving audio data 302 that corresponds to a training utterance 304. At operation 504, the method 500 includes generating a pair of positive audio data examples 312 (i.e., the first positive audio data example 312*a* and the second positive audio data example 312*b*) using a data augmentation module 310. Here, each positive audio data example 312 in the pair of positive audio data examples 312 includes a respective augmented copy of the received audio data 302 that corresponds to the training utterance 304. For each positive audio data example 312 in the pair of positive audio data examples 312, the method 500 performs operations 506 and 508. At operation 506, the method 500 includes generating a respective sequence of encoder outputs 212 using a neural network encoder 210. At operation 508, the method 500 includes projecting, using a CNN 340, the respective sequence of encoder outputs 212 for the respective positive audio data example 312 into a contrastive loss space (i.e., projected sequence of encoder outputs 342).

At operation 510, the method 500 includes determining a L2 distance 352 between each corresponding encoder output in the projected sequences of encoder outputs 342 for the positive audio data examples 312. At operation 512, the method 500 includes determining a per-utterance consistency loss 355 by averaging the L2 distances 352 determined for the encoder outputs in the projected sequences of encoder outputs 242. At operation 514, the method 500 includes generating corresponding speech recognition results 322 for each positive audio data example 312 in the pair of positive audio data examples 312 using an ASR model 200. In particular, a decoder 320 decodes the respective sequence of encoder outputs 212 to generate the speech recognition results 322. At operation 516, the method 500 includes updating parameters of the ASR model 200 based on a respective supervised loss term 335 associated with each corresponding speech recognition result 322 and the per-utterance consistency loss 355.

Figure 6:
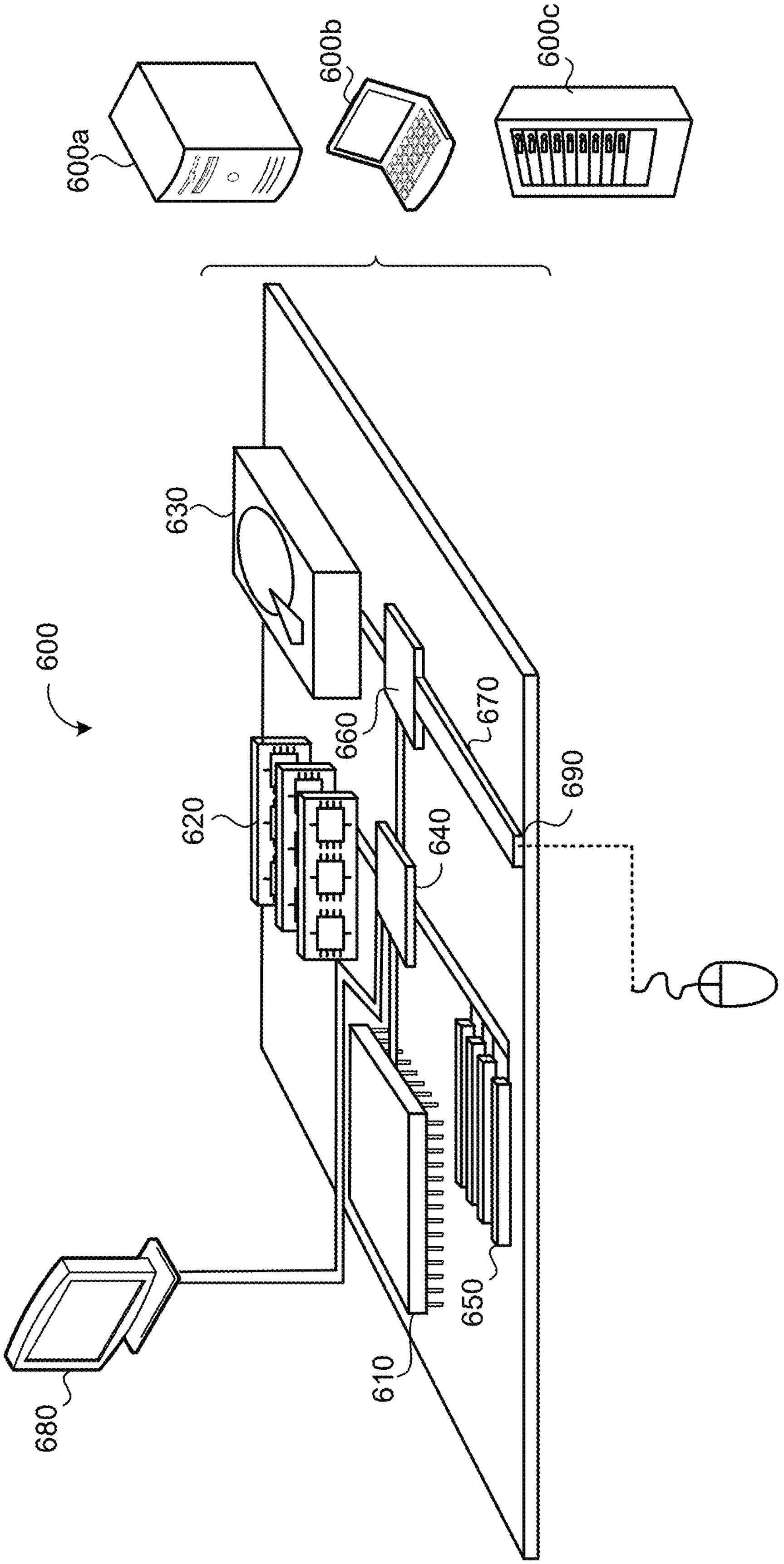
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executing on data processing hardware that causes the data processing hardware to perform operations comprising:

receiving audio data corresponding to an utterance of non-synthetic speech;

generating, using a data augmentation module, a pair of augmented copies of the received audio data corresponding to the utterance, the pair of augmented copies of the received audio data comprising:

a first augmented copy of the received audio data having a first amount of augmentation applied by the data augmentation module; and a second augmented copy of the received audio data having a second amount of augmentation applied by the data augmentation module, the second amount of augmentation greater than the first amount of data augmentation;

for each respective augmented copy in the pair of augmented copies of the received audio data:

generating, using an encoder, a respective sequence of encoder outputs;

projecting, using a convolutional neural network (CNN), the respective sequence of encoder outputs for the respective augmented copy in a contrastive loss space; and generating, using a speech recognition model, a respective speech recognition result;

determining a per-utterance consistency loss based on the respective sequences of encoder outputs for the pair of augmented copies of the received audio data projected into the contrastive loss space; and updating parameters of the speech recognition model based on a respective supervised loss term associated with each of the respective speech recognition results and the per-utterance consistency loss.

2. The method of claim 1, wherein the encoder comprises a Conformer-based encoder.

3. The method of claim 1, wherein the speech recognition model comprises a recurrent neural network-transducer (RNN-T) architecture.

4. The method of claim 3, wherein the RNN-T architecture comprises:

a Conformer-based encoder;

a long short-term memory (LSTM)-based prediction network; and a LSTM-based joint network.

5. The method of claim 4, wherein the Conformer-based encoder comprises a stack of conformer layers each comprising a series of multi-headed self-attention, depth-wise convolution, and feedforward layers.

6. The method of claim 1, wherein the CNN comprises a first CNN layer, followed by a rectified linear activation function (ReLU) activation and LayerNorm layer, and a second CNN layer with linear activation.

7. The method of claim 1, wherein the data augmentation module adds at least one of noise, reverberation, or manipulates timing of the received audio data.

8. The method of claim 1, wherein generating the respective speech recognition result for each respective augmented copy in the pair of augmented copies of the received audio data comprises determining, using a decoder, a probability distribution over possible speech recognition hypotheses for the respective sequence of encoder outputs.

9. The method of claim 1, wherein the operations further comprise determining the respective supervised loss term by comparing the respective speech recognition result for the respective augmented copy and a corresponding ground-truth transcription of the utterance.

10. The method of claim 1, wherein generating the pair of augmented copies of the received audio data corresponding to the utterance comprises generating each augmented copy in the pair of augmented copies based on a single observation of the utterance.

11. A system comprising:

data processing hardware; and memory hardware in communication with the data processing hardware, the memory hardware storing instructions that when executed on the data processing hardware cause the data processing hardware to perform operations comprising:

receiving audio data corresponding to an utterance of non-synthetic speech;

generating, using a data augmentation module, a pair of augmented copies of the received audio data corresponding to the utterance, the pair of augmented copies of the received audio data comprising:

a first augmented copy of the received audio data having a first amount of augmentation applied by the data augmentation module; and a second augmented copy of the received audio data having a second amount of augmentation applied by the data augmentation module, the second amount of augmentation greater than the first amount of data augmentation;

for each respective augmented copy in the pair of augmented copies of the received audio data:

generating, using an encoder, a respective sequence of encoder outputs;

projecting, using a convolutional neural network (CNN), the respective sequence of encoder outputs for the respective augmented copy in a contrastive loss space; and generating, using a speech recognition model, a respective speech recognition result;

determining a per-utterance consistency loss based on the respective sequences of encoder outputs for the pair of augmented copies of the received audio data projected into the contrastive loss space; and updating parameters of the speech recognition model based on a respective supervised loss term associated with each of the respective speech recognition results and the per-utterance consistency loss.

12. The system of claim 11, wherein the encoder comprises a Conformer-based encoder.

13. The system of claim 11, wherein the speech recognition model comprises a recurrent neural network-transducer (RNN-T) architecture.

14. The system of claim 13, wherein the RNN-T architecture comprises:

a Conformer-based encoder;

a long short-term memory (LSTM)-based prediction network; and a LSTM-based joint network.

15. The system of claim 14, wherein the Conformer-based encoder comprises a stack of conformer layers each comprising a series of multi-headed self-attention, depth-wise convolution, and feedforward layers.

16. The system of claim 11, wherein the CNN comprises a first CNN layer, followed by a rectified linear activation function (ReLU) activation and LayerNorm layer, and a second CNN layer with linear activation.

17. The system of claim 11, wherein the data augmentation module adds at least one of noise, reverberation, or manipulates timing of the received audio data.

18. The system of claim 11, wherein generating the respective speech recognition result for each respective augmented copy in the pair of augmented copies of the received audio data comprises determining, using a decoder, a probability distribution over possible speech recognition hypotheses for the respective sequence of encoder outputs.

19. The system of claim 11, wherein the operations further comprise determining the respective supervised loss term by comparing the respective speech recognition result for the respective augmented copy and a corresponding ground-truth transcription of the utterance.

20. The system of claim 11, wherein generating the pair of augmented copies of the received audio data corresponding to the utterance comprises generating each augmented copy in the pair of augmented copies based on a single observation of the utterance.

* * * * *